(12) United States Patent
Monroe et al.

(10) Patent No.: US 8,003,578 B2
(45) Date of Patent: Aug. 23, 2011

(54) METHOD OF TREATING A WELL AND A SUBTERRANEAN FORMATION WITH ALKALI NITRATE BRINE

(75) Inventors: Terry D. Monroe, Tomball, TX (US);
Daniel P. Vollmer, Lafayette, LA (US);
Bruce A. Comeaux, Lockport, LA (US);
Kay E. Cawiezel, Fulshear, TX (US)

(73) Assignee: Baker Hughes Incorporated, Houston, TX (US)

( * ) Notice: Subject to any disclaimer, the term of this patent is extended or adjusted under 35 U.S.C. 154(b) by 374 days.

(21) Appl. No.: 12/030,614

(22) Filed: Feb. 13, 2008

(65) Prior Publication Data
US 2009/0203554 A1  Aug. 13, 2009

(51) Int. Cl.
*C09K 8/08* (2006.01)
(52) U.S. Cl. ........ 507/217; 507/211; 507/269; 166/282; 166/283; 166/305.1
(58) Field of Classification Search .......................... None
See application file for complete search history.

(56) References Cited

U.S. PATENT DOCUMENTS

| | | | |
|---|---|---|---|
| 3,456,589 A * | 7/1969 | Slykhouse et al. ............ | 102/313 |
| 3,954,142 A | 5/1976 | Broaddus et al. | |
| 4,627,496 A | 12/1986 | Ashford et al. | |
| 4,714,115 A | 12/1987 | Uhri | |
| 4,887,670 A | 12/1989 | Lord et al. | |
| 4,900,457 A | 2/1990 | Clarke-Sturman et al. | |
| 5,065,822 A * | 11/1991 | Miller et al. ............ | 166/295 |
| 5,082,579 A | 9/1992 | Dawson | |
| 5,145,590 A | 9/1992 | Dawson | |
| 5,159,979 A | 11/1992 | Jennings, Jr. | |
| 5,304,620 A | 4/1994 | Holtmyer et al. | |
| 5,325,921 A | 7/1994 | Johnson et al. | |
| 5,363,919 A | 11/1994 | Jennings, Jr. | |
| 5,373,901 A | 12/1994 | Norman et al. | |
| 5,393,439 A | 2/1995 | Laramay et al. | |
| 5,439,057 A | 8/1995 | Weaver et al. | |
| 5,575,335 A | 11/1996 | King | |
| 5,616,541 A | 4/1997 | Dobson, Jr. et al. | |
| 5,680,900 A | 10/1997 | Nguyen et al. | |
| 5,759,964 A | 6/1998 | Shuchart et al. | |
| 5,785,747 A | 7/1998 | Vollmer et al. | |
| 5,996,694 A | 12/1999 | Dewprashad et al. | |
| 6,100,222 A | 8/2000 | Vollmer et al. | |
| 6,209,646 B1 * | 4/2001 | Reddy et al. ............ | 166/300 |
| 6,432,885 B1 | 8/2002 | Vollmer | |
| 6,444,316 B1 | 9/2002 | Reddy et al. | |
| 6,489,270 B1 | 12/2002 | Vollmer et al. | |
| 6,509,301 B1 | 1/2003 | Vollmer et al. | |

(Continued)

FOREIGN PATENT DOCUMENTS

WO    2004/090282 A1    10/2004

*Primary Examiner* — John J Figueroa
(74) *Attorney, Agent, or Firm* — John Wilson Jones; Jones & Smith, LLP

(57) ABSTRACT

Brine-based well treatment compositions containing alkali nitrate exhibit greater thermal stability when used in deep wells than substantially similar brine-based well treatment compositions which do not contain an alkali nitrate. The brine is thickened with a water-soluble crosslinkable polymer and crosslinking agent. The enhanced thermal stability of the well treatment compositions allows use of the fluids at elevated temperatures, for instance as high as 400° F.

20 Claims, 2 Drawing Sheets

U.S. PATENT DOCUMENTS

| | | |
|---|---|---|
| 6,554,071 B1 | 4/2003 | Reddy et al. |
| 6,613,720 B1 * | 9/2003 | Feraud et al. ............... 507/200 |
| 6,632,779 B1 | 10/2003 | Vollmer et al. |
| 6,640,898 B2 | 11/2003 | Lord et al. |
| 6,746,992 B2 | 6/2004 | Kippie et al. |
| 6,762,154 B2 | 7/2004 | Lungwitz et al. |
| 6,776,235 B1 | 8/2004 | England |
| 6,784,140 B2 | 8/2004 | Kippie et al. |
| 6,918,445 B2 | 7/2005 | Todd et al. |
| 6,929,069 B2 | 8/2005 | Hinkel et al. |
| 6,976,538 B2 | 12/2005 | Wilson et al. |
| 6,987,083 B2 * | 1/2006 | Phillippi et al. ............... 507/213 |
| 7,018,956 B2 | 3/2006 | Dobson, Jr. et al. |
| 7,165,617 B2 | 1/2007 | Lord et al. |
| 7,213,651 B2 | 5/2007 | Brannon et al. |
| 7,256,160 B2 | 8/2007 | Crews |
| 7,299,876 B2 | 11/2007 | Lord et al. |
| 2003/0130133 A1 | 7/2003 | Vollmer |
| 2003/0236174 A1 | 12/2003 | Fu et al. |
| 2004/0023812 A1 | 2/2004 | England et al. |
| 2004/0206497 A1 | 10/2004 | Gonzalez et al. |
| 2004/0238169 A1 | 12/2004 | Todd et al. |
| 2005/0003965 A1 | 1/2005 | Xiao et al. |
| 2005/0022993 A1 | 2/2005 | Wilson et al. |
| 2005/0101490 A1 | 5/2005 | Vollmer |
| 2005/0101491 A1 | 5/2005 | Vollmer |
| 2005/0113264 A1 | 5/2005 | Vollmer |
| 2005/0148475 A1 | 7/2005 | Maresh et al. |
| 2005/0261138 A1 | 11/2005 | Robb et al. |
| 2006/0014648 A1 | 1/2006 | Milson et al. |
| 2006/0178273 A1 | 8/2006 | Maresh |
| 2006/0178274 A1 | 8/2006 | Maresh |
| 2006/0234871 A1 * | 10/2006 | Dalrymple et al. ............ 507/211 |
| 2007/0235190 A1 | 10/2007 | Lord et al. |

* cited by examiner

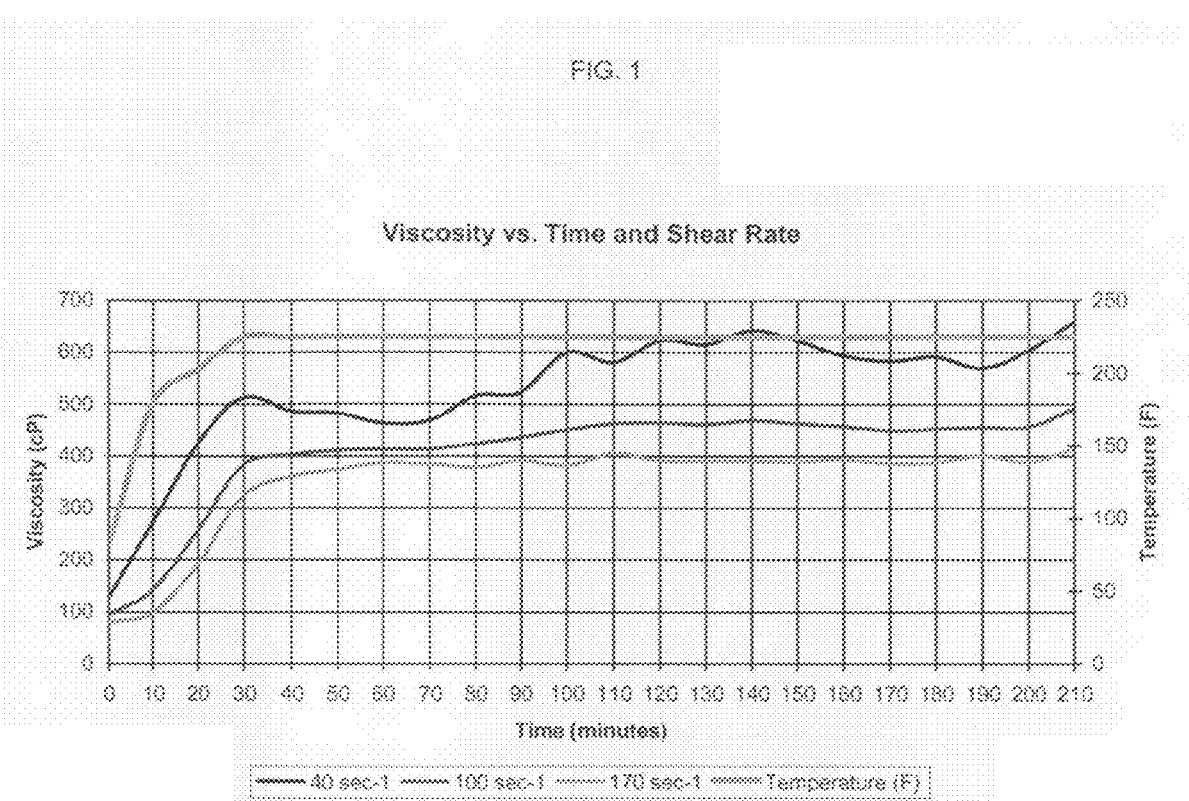

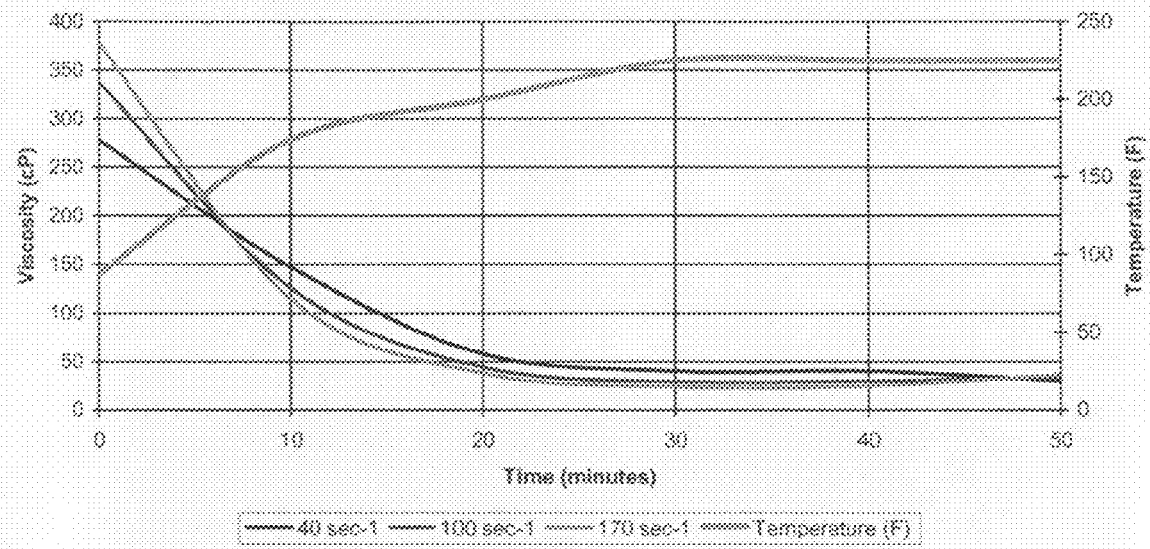

METHOD OF TREATING A WELL AND A SUBTERRANEAN FORMATION WITH ALKALI NITRATE BRINE

FIELD OF THE INVENTION

The invention relates to well treatment fluids which exhibit enhanced thermal stability and which contain a brine of an alkali nitrate and to methods of using such compositions.

BACKGROUND OF THE INVENTION

Aqueous based well treatment fluids are commonly used in drilling, stimulation, completion and workover operations of subterranean formations. Treatment designs typically mandate such fluids to exhibit a certain level of viscosity. Viscosifying polymers, such as polysaccharides, are often used in such fluids therefore to provide the requisite viscosity. For instance, the viscosifying polymer often provides the requisite level of viscosity needed to prevent the loss of well treatment fluids into the formation. In drilling fluids, such polymers serve to suspend solids and assist in floating debris out of the wellbore.

Unfortunately, the thermal stability of aqueous well treatment fluids containing a viscosifying polymer is often compromised as such fluids pass down the wellbore and are exposed to increasing temperatures. Temperatures in subterranean formations generally rise about 1° C. per hundred feet of depth. It is important, therefore, that such aqueous fluids are thermally stable at elevated temperatures.

Thermal instability typically causes degradation of the polymeric viscosifying agent which causes the viscosity of the well treatment fluid to decrease. A decrease in viscosity of a well treatment fluid often has detrimental effects on the wellbore treatment operation. For instance, a decrease in viscosity of drilling fluid often results in loss of suspension of drill cuttings which, in turns, results in the inability of such cuttings to float out of the wellbore. In addition, during drilling operations, degradation of the polymeric viscosifying agent may cause the drill string to bind in the wellbore and induce formation damage.

Ancillary to the need for maintaining viscosity, the well treatment fluid must have a sufficiently high density for the well treatment fluid to be operable at high temperatures and be able to withstand relatively high fluid pressures downhole.

High density brines have been found to have particular applicability in deep wells, such as those that descend 15,000 to 30,000 feet (4,500 to 10,000 meters) or more below the earth's surface, where it is most desirous to reduce pump pressure. Such brines have been found to be capable of maintaining the requisite lubricity and viscosity of the well treatment fluid under extreme shear, pressure and temperature variances encountered during operations of deep wells.

Exemplary of high density brines are sodium chloride, potassium chloride, calcium chloride, sodium bromide, calcium bromide, zinc bromide, potassium formate, cesium formate and sodium formate brines. While nitrate brines have been suggested for use in well treatment fluids such as completion and packer fluids, efforts to use such brines for such applications were abandoned, however, in the late 1950s after it was discovered that they contributed to stress corrosion cracking of carbon steels. Intergranular corrosion was further found to be caused when mixing chloride and nitrates. See, for instance, Hudgins and Greathouse, "Corrosion Problems in the Use of Dense Salt Solutions", *Corrosion*, November, 1960, wherein it was reported the corrosion process could be inhibited by saturating the brine with lime or by keeping the pH above about 9. However, entrained carbon dioxide from the producing well reduced the pH of the brine. The use of such brines was, therefore, severely hindered.

One area of particular applicability for high density brines is in production stimulation treatments of deep wells wherein the brine fluid is used as a fracturing fluid. Pumping through work strings in such wells typically requires tremendous pressures. It is not uncommon that the amount of horsepower required for a job cannot be provided in light of the extremely high friction pressures generated during the pumping stage. In such instances, the hydrostatic pressure of a high density fluid counterbalances the pressure exerted by the fluid in the strata. In addition to having high density, the fracturing fluid must be highly viscous in order for it to suspend proppant. It is the proppant which is deposited into the created fractures and which prevents the formed fractures from closing after the completion of pumping. Conductive channels are thereby formed through which produced fluids may flow to the wellbore.

Unfortunately, under the severe wellbore conditions encountered in the treatment of deep wells, many viscosifying agents, particularly polysaccharides, degrade and depolymerize, thus losing their effectiveness.

As interest in treatment operations at deeper depths increases, there is a continual need for alternative well treatment fluids having enhanced thermal stability and which maintain their density at downhole conditions at least for two to three hours. It is further important that such alternative well treatment fluids be capable of reducing the requisite pump pressure generated during the well treatment operation.

SUMMARY OF THE INVENTION

A well treatment fluid containing a crosslinkable polymer, crosslinking agent and a brine containing alkali nitrate is capable of maintaining greater viscosity than a corresponding similar brine-based fluid which does not contain an alkali nitrate. The well treatment fluids defined herein further exhibit enhanced thermal stability when compared to similar brine-based fluids which do not contain an alkali nitrate. The well treatment fluids defined herein, in addition to exhibiting enhanced thermal stability, are further capable of maintaining their density when exposed to deep well conditions. For instance, the well treatment fluids defined herein may demonstrate enhanced thermal stability and maintain their density at downhole temperatures greater than or equal to 400° F.

The density of the brine based well treatment fluids defined herein is typically greater than or equal to 9.0, preferably between from about 9.0 to about 14.0. Typically, the brine is an admixture of an alkali nitrate and an alkali halide, such as sodium bromide.

The crosslinkable polymer of the well treatment fluids is typically guar, hydroxypropyl guar, xanthan gum, carboxymethylhydroxyethyl cellulose or hydroxyethyl cellulose.

The well treatment fluid further contains a crosslinking agent. A crosslinking agent, such as a borate crosslinking agent, is especially desirable when the crosslinkable polymer is guar or hydroxypropyl guar.

The well treatment fluid may be introduced into a wellbore exposed to high downhole temperatures without degradation of the fluid. The sustained viscosity of the well treatment fluid at such downhole temperatures ensures suspension of solids in the fluid as the fluid circulates through the wellbore.

The well treatment fluids defined herein have particular applicability when used in such well treatment operations as drilling, stimulation, completion, and workover. In a preferred embodiment, the well treatment fluid is introduced into a wellbore penetrating a subterranean formation and is used as a fracturing fluid. In another embodiment, the well treatment fluid is used to form, subsequent to its introduction into the wellbore, an impermeable barrier. As such, the well treatment composition is efficacious in reducing the loss of circulation fluids (such as drilling fluids, completion fluids and workover fluids) in the wellbore and/or into the flow passages of a formation during well drilling, completion and workover operations.

BRIEF DESCRIPTION OF THE DRAWINGS

In order to more fully understand the drawings referred in the Detailed Description of the Preferred Embodiments, a brief description of each drawing is presented, in which:

FIG. 1 is a viscosity profile of a well treatment composition containing sodium nitrate/sodium bromide brine.

FIG. 2 is a viscosity profile of a well treatment composition similar to that of FIG. 1 but containing only sodium bromide brine.

DETAILED DESCRIPTION OF THE PREFERRED EMBODIMENTS

The thermal stability of aqueous well treatment fluids defined herein is improved by use of nitrate brine containing fluids. The viscosity and/or thermal stability exhibited by a well treatment fluid containing an alkali nitrate brine at a given downhole temperature is greater than the viscosity and/or thermal stability exhibited by a substantially similar well treatment fluid having the same pH, polymer, crosslinking agent and polymer loading but which does not contain an alkali nitrate containing brine.

For instance, a well treatment fluid containing 60 parts per gallon (ppg) guar (as crosslinkable polymer) in a 13.1 ppg sodium nitrate/sodium bromide brine exhibits enhanced thermal stability when compared to a well treatment fluid containing 60 ppg guar in a 12.5 ppg sodium bromide brine.

As such, the presence of the nitrate brine serves to maintain stability of the fluid at a temperature greater than about 150° F., generally greater than 200° F. In most instances, the well treatment fluid defined herein demonstrates enhanced thermal stability at downhole temperatures in excess of 300° F. Typically, the well treatment fluid demonstrates enhanced thermal stability at a downhole temperature in excess of 350° F. Since temperatures in excess of 350° F. are typically encountered at well depths over 15,000 feet deep (4,500 m), the well treatment fluids defined herein have particular usefulness in deep well operations. The viscosity of the well treatment fluids defined herein is further maintained under the extremely high temperature, pressure and shear conditions seen in deep well operations.

Similarly, thermal stability at a desired temperature may be attained using less polymer with the well treatment fluids defined herein as compared to a substantially similar well treatment fluid which does not contain an alkali nitrate containing brine.

Further, the viscosity of a well treatment fluid introduced into a wellbore may be maintained over a longer time duration at a given temperature when a well treatment fluid defined herein is used as compared to a substantially similar well treatment fluid which does not contain an alkali nitrate containing brine. The well treatment fluids defined herein are typically capable of maintaining a viscosity greater than or equal to about 200 cP at about 40 sec$^{-1}$ shear rate at a temperature of 325° F. for over 60 minutes. The ability of well treatment fluids defined herein to exhibit and maintain increased viscosity means that there is a reduced tendency for them to leak off into the formation. As such, the well treatment fluids defined herein are highly compatible when used as a fluid loss pill.

The density of the brine based well treatment fluid is typically greater than or equal to 9.0 and preferably is between from about 9.0 to about 14.0. In light of the enhanced stability of the well treatment fluid, the density of the fluid is maintained at the operating conditions of the wellbore.

The pH of the well treatment fluid is preferably selected such that chemical degradation of the fluid at operating conditions is minimized. The desired pH stability of the fluid is typically achieved when a pH of 8.0, more preferably 9.0, or greater is maintained. Suitable pH adjustment agents, such as soda ash, potassium hydroxide, sodium hydroxide and alkaline and alkali carbonates and bicarbonates, may be used to maintained the desired pH.

Typically the brine, in addition to containing an alkali nitrate salt, further contains an alkali halide, such as sodium bromide or sodium chloride. Typically the weight ratio of alkali halide to alkali nitrate in the brine is between from about 5:95 to about 95:5. As an example, a brine having a density of 13.1 ppg at 70° F. is often chosen since it may easily be prepared by adding enough sodium nitrate to a 12.5 ppg sodium bromide brine to render a saturated brine. Thus, the amount of alkali nitrate in the brine may be that amount sufficient to render a saturated brine. The admixture of salts may provide a brine having a density therefore which is higher than the density of a brine containing only one of the salts.

The nitrate brine of the well treatment fluid is thickened with a crosslinkable polymer. Generally, the well treatment fluid contains between from about 0.1 to about 5 wt % of crosslinkable polymer, preferably about 0.5 to about 4 weight %, even more preferably about 1 to about 3 weight %. Typical polymers include anionic or nonionic polysaccharides, such as cellulose, starch, galactomannan gums, polyvinyl alcohols, polyacrylates, polyacrylamides and mixtures thereof. Crosslinkable cellulose and cellulose derivatives include hydroxyalkyl cellulose, alkylhydroxyalkyl cellulose, carboxyalkyl cellulose and carboxyalkylhydroxyalkyl cellulose derivatives such as hydroxyethyl cellulose, hydroxypropyl cellulose, hydroxybutyl cellulose, hydroxyethylmethyl cellulose, hydroxypropylmethyl cellulose, hydroxylbutylmethyl cellulose, methylhydroxyethyl cellulose, methylhydroxypropyl cellulose, ethylhydroxyethyl cellulose, carboxyethylcellulose, carboxymethylcellulose and carboxymethylhydroxyethyl cellulose. Galactomannan gums include guar gum, hydroxyalkyl guar and carboxyalkylhydroxyalkyl guar and microbial polysaccharides include xanthan, succinoglycan and scleroglucan.

Particularly preferred as crosslinkable polymer are guar, hydroxypropyl guar, xanthan gum, carboxymethylhydroxyethyl cellulose, carboxymethylhydroxypropyl cellulose and hydroxyethyl cellulose.

The fluid may further contain a crosslinking delay agent to control, along with the crosslinking agent, viscosification of the well treatment composition. Suitable crosslinking delay agents may include organic polyols, such as sodium gluconate; sodium glucoheptonate, sorbitol, mannitol, phosphonates, bicarbonate salt, salts, various inorganic and weak organic acids including aminocarboxylic acids and their salts (EDTA, DTPA, etc.) and citric acid and mixtures thereof. Preferred crosslinking delaying agents include various organic or inorganic acids, sorbitol as well as mixtures thereof.

Further, when used as a fracturing fluid, a delayed internal breaker may be included such that, once the proppant is placed in the fracture, the viscosity of the fluid may then be decreased in order to maximize flowback of the producing well. Delayed internal breakers can include but not limited to peroxides, enzymes, and esters or mixtures thereof.

Suitable crosslinking agents include a borate ion releasing compound, an organometallic or organic complexed metal ion comprising at least one transition metal or alkaline earth metal ion as well as mixtures thereof. Typically, the crosslinking agent is employed in the composition in a concentration of from about 0.001 percent to about 2 percent, preferably from about 0.005 percent to about 1.5 percent, and, most preferably, from about 0.01 percent to about 1.0 percent.

Borate ion releasing compounds which can be employed include, for example, any boron compound which will supply borate ions in the composition, for example, boric acid, alkali metal borates such as sodium diborate, potassium tetraborate, sodium tetraborate (borax), pentaborates and the like and alkaline and zinc metal borates. Such borate ion releasing compounds are disclosed in U.S. Pat. No. 3,058,909 and U.S. Pat. No. 3,974,077 herein incorporated by reference. In addition, such borate ion releasing compounds include boric oxide (such as selected from $H_3BO_3$ and $B_2O_3$) and polymeric borate compounds. An example of a suitable polymeric borate compound is a polymeric compound of boric acid and an alkali borate which is commercially available under the trademark POLYBOR® from U.S. Borax of Valencia, Calif. Mixtures of any of the referenced borate ion releasing compounds may further be employed. Such borate-releasers typically require a basic pH (e.g., 7.0 to 12) for crosslinking to occur.

Further preferred crosslinking agents are reagents, such as organometallic and organic complexed metal compounds, which can supply zirconium IV ions such as, for example, zirconium lactate, zirconium lactate triethanolamine, zirconium carbonate, zirconium acetylacetonate and zirconium diisopropylamine lactate; as well as compounds that can supply titanium IV ions such as, for example, titanium ammonium lactate, titanium triethanolamine, and titanium acetylacetonate. Zr (IV) and Ti (IV) may further be added directly as ions or oxy ions into the composition.

Such organometallic and organic complexed metal crosslinking agents containing titanium or zirconium in a +4 valence state include those disclosed in British Pat. No. 2,108,122, herein incorporated by reference, which are prepared by reacting zirconium tetraalkoxides with alkanolamines under essentially anhydrous conditions. Other zirconium and titanium crosslinking agents are described, for example, in U.S. Patent Publication No. 20050038199, herein incorporated by reference. Other suitable crosslinking agents are metal ions, metal containing species, or mixture of such ions and species. Such agents include Zn (II), calcium, magnesium, aluminum, Fe (II), and Fe (III). These may be applied directly to the composition as ions or as polyvalent metallic compounds such as hydroxides and chlorides from which the ions may be released.

Where the crosslinkable polymer is guar or hydroxypropyl guar, borate crosslinking agent is preferred.

Especially preferred as crosslinking agents include the crosslinking system disclosed in U.S. Pat. No. 5,145,590, herein incorporated by reference. This crosslinking system is a complexor solution of a crosslinking additive and a delay additive which controls the rate at which the crosslinking additive promotes gellation of the crosslinkable polymer. The control rate is a function of the pH of the complexor solution. The crosslinking additive is a material which supplies free borate ions in solution and the delay additive is a material which binds chemically the borate ions in solution, such that the crosslinkable polymer is forced to compete with the delay additive for the free borate ions. As such, the crosslinking additive can be any convenient source of borate ions, for instance the alkali metal and the alkaline earth metal borates boron monoxide and boric acid. A preferred crosslinking additive is sodium borate decahydrate. The delay additive is preferably selected from dialdehydes having about 1 to 4 carbon atoms, keto aldehydes having about 1 to 4 carbon atoms, hydroxyl aldehydes having about 1-4 carbon atoms, ortho substituted aromatic dialdehydes and ortho substituted aromatic hydroxyl aldehydes. The most preferred delay additive is glyoxal. The crosslinking additive is present in a preselected amount to provide a quantity of borate ions or boric acid sufficient to normally over-crosslink the crosslinkable polymer without the presence of the delay additive. The delay additive serves to mask the presence of at least a portion of the borate ions at low temperature, thereby providing a reserve of borate ions for cross-linking the fluid at higher temperatures and provide improved gel stability. Typically, borate compound is present from about 5 to 25% by weight of the complexor solution. The delay additive used in the complexor solution is a material which attempts to bind chemically to the borate ions produced by the cross-linking additive in solution, whereby the hydrated crosslinkable polymer is forced to compete with the delay additive for the borate ions. Preferably, the delay additive is selected from the group consisting of dialdehydes having about 1-4 carbon atoms, keto aldehydes having about 1-4 carbon atoms, hydroxy aldehydes having about 1 to 4 carbon atoms, ortho substituted aromatic dialdehydes and ortho substituted aromatic hydroxyl aldehydes. Preferred delay additives include, for instance, glyoxal, propane dialdehyde, 2-keto propanal, 1,4-butanedial, 2-keto butanal, 2,3-butanedione, phthaldehyde, salicaldehyde, etc. The preferred delay additive is glyoxal. Preferably, the delay additive is present in the range from about 5 to 40% by weight of the complexor solution. The preferred ratio of delay additive to crosslinking additive ranges from about 1:0.1 to 1:1 and can approach 1:0.05.

The well treatment fluids defined herein may further include components suitable for modification of the rheological and chemical properties of the fluid. For instance, clayey (clay) materials, such as bentonite, attapulgite or sepiolite may be included in the well treatment fluid, when used as a drilling fluid, to lubricate the drill strings and suspend drill cuttings. The well treatment fluid may also include buffering agents or pH control additives such as sodium phosphate, sodium hydrogen phosphate, boric acid-sodium hydroxide, citric acid-sodium hydroxide, boric acid-borax, sodium bicarbonate, ammonium salts, sodium salts, potassium salts, dibasic phosphate, tribasic phosphate, lime, slaked lime, magnesium oxide, basic magnesium carbonate, calcium oxide and zinc oxide.

As indicated, the described well treatment fluids may be displaced into and used in a wellbore having high downhole temperatures without degradation of the fluid. The sustained viscosity of the well treatment fluid at such downhole temperatures ensures suspension of solids in the fluid as the fluid circulates through the wellbore. As such, the well treatment fluids defined herein have particular applicability when used in such well treatment operations as drilling, stimulation, completion, and workover. In a preferred embodiment, the well treatment fluids are used as fracturing fluids in hydraulic fracturing operations.

Further, the well treatment fluid may be effective in stopping or minimizing passage of fluid into a subterranean formation or into a wellbore by the creation of a fluid impermeable barrier. The barrier results upon viscosification of the fluid. Subsequent to its introduction into the wellbore as a pumpable composition, the well treatment fluid viscosifies and thickens into a highly viscous gel. The impermeable barrier reduces or eliminates the loss of wellbore fluid into the wellbore and/or the subterranean formation. After formation of the impermeable barrier, drilling, cementing, completion or workover is resumed. Viscosification of the fluid is inhibited until after the composition is introduced into or near the formation or targeted area. The presence of the crosslinking delay agent allows the well treatment fluid to be easily pumped into the wellbore.

The following examples will illustrate the practice of the present invention in its preferred embodiment. Other embodiments within the scope of the claims herein will be apparent to one skilled in the art from consideration of the specification and practice of the invention as disclosed herein. It is intended that the specification, together with the examples, be considered exemplary only, with the scope and spirit of the invention being indicated by the claims which follow.

EXAMPLES

Example 1

A solution was prepared by mixing 0.908 bbl of 12.5 ppg NaBr and 72.7 ppb of 99.9% sodium nitrate. The sodium nitrate completely dissolved and the solution was measure to have a density of 13.12 ppg at 76° F. The crystallization temperature of the fluid was measured to be 60° F.

Example 2

To the solution in Example 1, 40 Ib/Mgal (1.68 ppb) of guar gum was added using an overhead stirrer. The solution reached maximum viscosity at 511 l/sec of 55 cp. in 15 minutes. The fluid without the guar gum had a viscosity of 3.6 cp. at 511 l/sec. The pH of the fluid was raised to 11.2 with 25% by weight NaOH and 0.15 ppb of sodium tetraborodecahydrate was added to crosslink the guar gum. The fluid was then heated to 180° F. and the rheologies measured on an OFI Model 900 viscometer at 180° F. The viscosities at shear rates of 1022, 511, 340, 170, 10, 5 l/sec is 85, 120, 169, 278, 1,100 and 1,420 cp., respectively, indicating that the fluid was crosslinked.

Comparative Example 3

A brine slurry was prepared containing 40 ppg of guar (commercially available as GW-3LE from BJ Services Company) in 12.5 ppg sodium bromide. The fluid was mixed for 30 minutes using an overhead stirrer. To the fluid was then added, 15.0 gallons per thousand gallons of a potassium containing buffer capable of adjusting the pH of the fluid to a range of about 11.9, commercially available as BF-9L from BJ Services Company; 15.0 gallons per thousand gallons of a borate delayed crosslinking agent (commercially available as XLW-56 from BJ Services Company); and 8.0 pounds per thousand gallons of sodium thiosulfate oxygen scavenger. Thereafter, 45 ml sample of the fluid was placed into a Fann 50 viscometer cup having a bob (BX5) and rotor (R1) cup assembly. The cup was then placed on a Fann 50 viscometer. The sample was sheared by a rate sweep of 100 sec$^{-1}$ for about 1 minute. The sample was then subjected to different shear rates at varying temperatures. The stresses associated to each rate used in the sweep together with the sweep rate were then used to calculate the power law indices n and K; n refers to flow behavior index and K refers to consistency index set forth in the American Petroleum Institute's Bulletin RP-39. The fluid viscosity was then calculated by using the n and K values, and listed in Table I. The initial linear viscosity was 60 cP at 80° F. measured on a Chandler 3500 rheometer having a bob (B1) and rotor (R1) cup assembly at a rate of sweep of 511 sec$^{-1}$.

TABLE I

| Time Minutes | Temperature ° F. | n' (lb (f)/ft2) (sec) | K' lb (f)/100 ft2 | 40 1/sec Viscosity (cP) | 100 1/sec Viscosity (cP) | 170 1/sec Viscosity (cP) |
|---|---|---|---|---|---|---|
| 0 | 260 | 0.3578 | 34.8637 | 1562 | 867 | 617 |
| 10 | 287 | 0.2617 | 44.5075 | 1399 | 711 | 481 |
| 20 | 296 | 0.3602 | 29.2462 | 1322 | 735 | 524 |
| 30 | 300 | 0.8870 | 2.6705 | 843 | 760 | 716 |
| 40 | 300 | 1.6225 | 0.0752 | 358 | 633 | 881 |
| 50 | 300 | 2.3299 | 0.0022 | 142 | 481 | 975 |

Example 4

A brine slurry was prepared containing 40 ppg of GW-3LE guar in 13.1 ppg sodium bromide/sodium nitrate and mixed for 30 minutes using an overhead stirrer. To the fluid was then added, 4.5 gallons per thousand gallons of BF-9L, 0.10 gallons per thousand gallons of BF-10L. 3.0 gallons per thousand gallons of XLW-56 and 1.0 gallons of a borate crosslinking agent, commercially available from BJ Services Company as XLW-32 was also added along with 8.0 pounds per thousand gallons of sodium thiosulfate oxygen scavenger and 0.50 pounds per thousand gallons of a peroxide delayed release oxidative breaker, commercially available as GBW-24 from BJ Services Company. Thereafter, 65 ml sample of the fluid was placed into a Fann 50 viscometer cup having a bob (BX5) and rotor (R1) cup assembly fluid viscosity calculated as set forth in Example 3 above. The results are shown in Table II. The initial viscosity was 87 cP at 76° F.

TABLE II

| Time Minutes | Temperature ° F. | n' | K' lb (f)/100 ft2 | 40 1/sec Viscosity (cP) | 100 1/sec Viscosity (cP) | 170 1/sec Viscosity (cP) |
|---|---|---|---|---|---|---|
| 0 | 94 | 0.4179 | 35.9570 | 2011 | 1179 | 866 |
| 10 | 249 | 0.2031 | 84.9472 | 2151 | 1036 | 679 |
| 20 | 278 | 0.3878 | 32.9626 | 1649 | 941 | 680 |
| 30 | 300 | 0.1906 | 71.0904 | 1719 | 819 | 533 |
| 40 | 300 | 0.2631 | 56.5441 | 1786 | 909 | 615 |

TABLE II-continued

| Time Minutes | Temperature °F. | n' | K' lb (f)/100 ft2 | 40 1/sec Viscosity (cP) | 100 1/sec Viscosity (cP) | 170 1/sec Viscosity (cP) |
|---|---|---|---|---|---|---|
| 50 | 300 | 0.2912 | 52.8759 | 1853 | 968 | 664 |
| 60 | 300 | 0.2951 | 54.4192 | 1934 | 1014 | 698 |
| 70 | 300 | 0.4245 | 29.3440 | 1681 | 992 | 731 |
| 80 | 300 | 0.6252 | 14.9912 | 1801 | 1277 | 1047 |
| 90 | 300 | 0.8099 | 6.2326 | 1480 | 1243 | 1124 |
| 100 | 300 | 0.6746 | 11.3899 | 1642 | 1218 | 1025 |
| 110 | 300 | 1.0789 | 1.7382 | 1113 | 1197 | 1248 |
| 120 | 300 | 1.2071 | 0.8912 | 916 | 1107 | 1236 |
| 130 | 300 | 1.3567 | 0.4228 | 755 | 1046 | 1264 |
| 140 | 300 | 1.5201 | 0.1909 | 622 | 1003 | 1321 |
| 150 | 300 | 1.7041 | 0.0762 | 490 | 934 | 1357 |
| 160 | 300 | 1.9962 | 0.0183 | 346 | 861 | 1461 |
| 170 | 300 | 2.1569 | 0.0077 | 263 | 759 | 1403 |
| 180 | 300 | 2.2499 | 0.0045 | 217 | 681 | 1322 |
| 210 | 300 | 2.1610 | 0.0048 | 166 | 482 | 893 |
| 240 | 300 | 1.2395 | 0.1133 | 131 | 163 | 186 |
| 270 | 300 | 0.6374 | 0.9090 | 114 | 82 | 68 |
| 300 | 300 | 0.4987 | 1.3640 | 103 | 65 | 50 |

A comparison of Table I with Table II shows a higher viscosity (cP) for the composition containing sodium nitrate than the corresponding composition not containing the sodium nitrate and that the fluid retains viscosity for a longer time.

Example 5

A brine slurry was prepared containing 40 ppg of GW-3LE guar in 13.1 ppg sodium bromide/sodium nitrate and mixed for 30 minutes using an overhead stirrer. To the fluid was then added, 15.0 gallons per thousand gallons of BF-9L to adjust the pH of the fluid to a pH of 12.2 and 0.75 gallons per thousand gallons of BF-10L and 7.0 gallons per thousand gallons of XLW-56 and 1.0 gallons of XLW-32. 20.0 pounds per thousand gallons of sodium thiosulfate oxygen scavenger was also added. Thereafter, 45 ml sample of the fluid was placed into a Fann 50 viscometer cup having a bob (BX5) and rotor (R1) cup assembly fluid viscosity calculated as set forth in Example 3 above. The results are shown in Table III. The initial linear viscosity was 83 cP at 82° F. measured on a Chandler 3500 rheometer having a bob (B1) and rotor (R1) cup assembly at a rate of sweep of 511 sec$^{-1}$.

TABLE III

| Time Minutes | Temperature °F. | n' | K' lb (f)/100 ft2 | 40 1/sec Viscosity (cP) | 100 1/sec Viscosity (cP) | 170 1/sec Viscosity (cP) |
|---|---|---|---|---|---|---|
| 0 | 101 | 0.2052 | 73.6451 | 1879 | 907 | 595 |
| 10 | 265 | 0.2072 | 84.3219 | 2167 | 1048 | 688 |
| 20 | 306 | 0.1157 | 96.1381 | 1763 | 784 | 490 |
| 30 | 320 | 0.4178 | 28.0855 | 1570 | 921 | 676 |
| 40 | 323 | 0.6144 | 10.3184 | 1191 | 837 | 682 |
| 50 | 323 | 0.9680 | 2.0029 | 852 | 827 | 814 |
| 60 | 323 | 1.2236 | 0.5923 | 647 | 794 | 894 |
| 70 | 323 | 1.6234 | 0.0937 | 447 | 792 | 1102 |
| 80 | 325 | 2.1509 | 0.0054 | 180 | 518 | 954 |

When compared with Comparative Example 3, the fluid of Example 5 demonstrated enhanced thermal stability and viscosity at higher temperature.

Example 6

Example 5 was repeated except that the brine slurry contained 50 ppg of guar. The calculated viscosity is set forth in Table IV. The initial linear viscosity was 100 cP at 78° F. measured on a Chandler 3500 rheometer having a bob (B1) and rotor (R1) cup assembly at a rate of sweep of 511 sec$^{-1}$.

TABLE IV

| Time Minutes | Temperature °F. | n' | K' lb (f)/100 ft2 | 40 1/sec Viscosity (cP) | 100 1/sec Viscosity (cP) | 170 1/sec Viscosity (cP) |
|---|---|---|---|---|---|---|
| 0 | 113 | 0.7884 | 8.1877 | 1796 | 1479 | 1322 |
| 10 | 268 | 0.3599 | 47.9937 | 2167 | 1205 | 858 |
| 30 | 325 | 0.4503 | 27.8025 | 1752 | 1059 | 791 |
| 40 | 325 | 0.5112 | 22.4604 | 1772 | 1132 | 874 |
| 50 | 325 | 0.2546 | 64.2639 | 1967 | 994 | 669 |

TABLE IV-continued

| Time Minutes | Temperature ° F. | n' | K' lb (f)/100 ft2 | 40 1/sec Viscosity (cP) | 100 1/sec Viscosity (cP) | 170 1/sec Viscosity (cP) |
|---|---|---|---|---|---|---|
| 60 | 325 | 0.5019 | 23.2368 | 1771 | 1122 | 862 |
| 70 | 325 | 0.5265 | 18.7583 | 1566 | 1015 | 789 |
| 80 | 325 | 1.2101 | 0.7569 | 787 | 954 | 1066 |
| 90 | 325 | 1.6855 | 0.0837 | 502 | 942 | 1355 |
| 100 | 325 | 1.9140 | 0.0259 | 361 | 834 | 1355 |
| 110 | 325 | 2.0940 | 0.0100 | 271 | 738 | 1319 |
| 120 | 325 | 2.2056 | 0.0052 | 213 | 642 | 1217 |
| 130 | 325 | 2.4085 | 0.0018 | 156 | 565 | 1194 |
| 140 | 325 | 2.3824 | 0.0018 | 141 | 501 | 1044 |
| 150 | 325 | 2.3343 | 0.0018 | 118 | 402 | 816 |
| 160 | 325 | 2.1947 | 0.0025 | 98 | 293 | 553 |
| 170 | 325 | 1.9681 | 0.0048 | 82 | 198 | 332 |

Example 6 demonstrates enhanced thermal stability at increased polymer loading levels.

Example 7

The procedure of Example 6 was repeated using 50 ppg polymer loading except that 11.0 ppg sodium bromide/sodium nitrate was used. The fluid contained 15.0 gallons per thousand gallons of BF-9L to adjust the pH of the fluid to a pH of 12.1, 0.10 gallons per thousand gallons of BF-10L, 7.0 gallons per thousand gallons of XLW-56, 1.0 gallons of XLW-32 and 20.0 pounds per thousand gallons of sodium thiosulfate. The initial linear viscosity was 79 cP at 83° F. measured on a Chandler 3500 rheometer having a bob (B1) and rotor (R1) cup assembly at a rate of sweep of 511 sec$^{-1}$. The viscosity results are illustrated in Table V.

Table V illustrates enhanced thermal stability in lighter weight brine.

Example 8

A brine slurry was prepared containing 50 ppg of GW-3LE guar in 11.0 ppg sodium nitrate brine and mixed for 30 minutes using an overhead stirrer. To the fluid was then added, 15.0 gallons per thousand gallons of BF-9L to adjust the pH of the fluid to a pH of 12.2 and 7.0 gallons per thousand gallons of XLW-56 and 1.0 gallons of XLW-32. 20.0 pounds per thousand gallons of sodium thiosulfate oxygen scavenger was also added. Fluid viscosity was determined in accordance with the procedure set forth in Example 3 above. The results are shown in Table VI. The initial linear viscosity was 84 cP at 78° F. measured on a Chandler 3500 rheometer having a bob (B1) and rotor (R1) cup assembly at a rate of sweep of 511 sec$^{-1}$.

TABLE V

| Time Minutes | Temperature ° F. | n' | K' lb (f)/100 ft2 | 40 1/sec Viscosity (cP) | 100 1/sec Viscosity (cP) | 170 1/sec Viscosity (cP) |
|---|---|---|---|---|---|---|
| 0 | 101 | 1.1601 | 2.5546 | 2208 | 2556 | 2783 |
| 10 | 244 | 0.2122 | 87.7461 | 2297 | 1116 | 735 |
| 20 | 276 | 0.4544 | 33.2151 | 2125 | 1289 | 965 |
| 30 | 291 | 0.2692 | 64.1826 | 2074 | 1061 | 720 |
| 40 | 300 | 0.5441 | 18.8349 | 1678 | 1105 | 867 |
| 50 | 300 | 1.2420 | 0.7992 | 934 | 1166 | 1326 |
| 60 | 300 | 1.2531 | 0.8330 | 1014 | 1279 | 1463 |
| 70 | 300 | 1.5112 | 0.2342 | 739 | 1181 | 1548 |
| 80 | 300 | 1.7935 | 0.0679 | 607 | 1256 | 1914 |
| 90 | 300 | 1.8326 | 0.0515 | 532 | 1141 | 1774 |
| 100 | 300 | 1.8584 | 0.0424 | 482 | 1057 | 1668 |
| 110 | 300 | 1.8567 | 0.0387 | 437 | 958 | 1509 |
| 120 | 300 | 1.8316 | 0.0394 | 405 | 869 | 1350 |
| 130 | 300 | 1.7758 | 0.0444 | 372 | 757 | 1143 |
| 140 | 300 | 1.7447 | 0.0458 | 342 | 677 | 1005 |
| 150 | 300 | 1.6983 | 0.0496 | 312 | 592 | 857 |
| 160 | 300 | 1.6071 | 0.0636 | 286 | 499 | 688 |
| 170 | 300 | 1.5230 | 0.0798 | 263 | 425 | 561 |
| 180 | 300 | 1.4185 | 0.1055 | 236 | 347 | 433 |
| 190 | 300 | 1.3186 | 0.1396 | 216 | 290 | 343 |
| 200 | 300 | 1.2216 | 0.1835 | 199 | 244 | 274 |
| 210 | 300 | 1.1365 | 0.2300 | 182 | 206 | 222 |
| 220 | 300 | 1.0340 | 0.3117 | 169 | 175 | 178 |
| 230 | 300 | 0.9705 | 0.3631 | 156 | 152 | 149 |
| 240 | 300 | 0.9056 | 0.4286 | 145 | 133 | 126 |
| 250 | 300 | 0.8408 | 0.5127 | 136 | 118 | 108 |
| 260 | 300 | 0.7931 | 0.5763 | 129 | 106 | 95 |
| 270 | 300 | 0.7522 | 0.6249 | 120 | 96 | 84 |
| 280 | 300 | 0.6836 | 0.7720 | 115 | 86 | 73 |
| 290 | 300 | 0.6437 | 0.8476 | 109 | 79 | 65 |

TABLE VI

| Time Minutes | Temperature ° F. | n' | K' lb (f)/100 ft2 | 40 1/sec Viscosity (cP) | 100 1/sec Viscosity (cP) | 170 1/sec Viscosity (cP) |
|---|---|---|---|---|---|---|
| 0 | 101 | 1.2346 | 2.2536 | 2563 | 3178 | 3599 |
| 10 | 265 | 0.2893 | 45.5669 | 1585 | 827 | 567 |
| 20 | 306 | 0.2940 | 50.9491 | 1804 | 945 | 649 |
| 30 | 320 | 0.3285 | 42.8444 | 1723 | 931 | 652 |
| 40 | 320 | 0.2218 | 66.9049 | 1815 | 890 | 589 |
| 50 | 320 | 0.3954 | 31.1814 | 1605 | 922 | 669 |
| 60 | 320 | 0.4281 | 27.0695 | 1572 | 931 | 687 |
| 70 | 320 | 0.4959 | 20.4952 | 1528 | 963 | 737 |
| 80 | 320 | 0.5888 | 13.5870 | 1427 | 979 | 787 |
| 90 | 320 | 0.6984 | 8.8342 | 1390 | 1055 | 899 |
| 100 | 320 | 0.8383 | 4.8514 | 1279 | 1103 | 1012 |
| 110 | 320 | 0.9121 | 3.3567 | 1162 | 1072 | 1023 |
| 120 | 320 | 0.9975 | 2.2591 | 1072 | 1069 | 1068 |
| 130 | 320 | 1.0497 | 1.7077 | 982 | 1028 | 1055 |
| 140 | 320 | 1.0949 | 1.4244 | 968 | 1056 | 1110 |
| 150 | 320 | 1.1492 | 1.0174 | 845 | 968 | 1048 |
| 160 | 320 | 1.2143 | 0.7570 | 799 | 972 | 1089 |
| 170 | 320 | 1.3324 | 0.4330 | 707 | 958 | 1143 |
| 180 | 320 | 1.3723 | 0.3271 | 618 | 870 | 1060 |
| 190 | 320 | 1.5052 | 0.1680 | 519 | 824 | 1077 |
| 200 | 320 | 1.6686 | 0.0759 | 428 | 790 | 1126 |
| 210 | 320 | 1.9064 | 0.0241 | 327 | 750 | 1213 |
| 220 | 325 | 1.9181 | 0.0119 | 168 | 391 | 636 |
| 230 | 325 | 1.9204 | 0.0107 | 153 | 355 | 579 |
| 240 | 325 | 1.8419 | 0.0131 | 140 | 303 | 473 |
| 250 | 325 | 1.7978 | 0.0143 | 130 | 270 | 412 |
| 260 | 325 | 1.7262 | 0.0157 | 110 | 213 | 313 |
| 270 | 325 | 1.5069 | 0.0314 | 98 | 155 | 203 |
| 280 | 325 | 1.2597 | 0.0717 | 89 | 114 | 130 |
| 290 | 325 | 1.0146 | 0.1702 | 86 | 87 | 88 |
| 300 | 325 | 0.7915 | 0.3495 | 78 | 64 | 57 |

Table VI demonstrates that excellent viscosity and thermal stability is obtained by use of a brine containing solely sodium nitrate.

Example 9

A brine slurry was prepared containing 25 ppg of GW-3LE guar in 13.1 ppg sodium bromide/sodium nitrate brine and mixed for 30 minutes using an overhead stirrer. To the fluid was then added, 4.0 gallons per thousand gallons of BF-9L to adjust the pH of the fluid to a pH of 11.4 and 0.10 gallons per thousand gallons of BF-10L. 1.250 gallons per thousand gallons of XLW-30, a borate ore slurried in hydrocarbon oil, a product of BJ Services Company. Thereafter, 45 ml sample of the fluid was placed into a Fann 50 viscometer cup having a bob (BX5) and rotor (R1) cup assembly fluid viscosity calculated as set forth in Example 3 above. The results are shown in Table VII. The initial linear viscosity was 40 cP at 73° F. measured on a Chandler 3500 rheometer having a bob (B1) and rotor (R1) cup assembly at a rate of sweep of 511 sec$^{-1}$.

TABLE VII

| Time Minutes | Temperature ° F. | n' | K' lb (f)/100 ft2 | 40 1/sec Viscosity (cP) | 100 1/sec Viscosity (cP) | 170 1/sec Viscosity (cP) |
|---|---|---|---|---|---|---|
| 0 | 79 | 0.6439 | 0.7586 | 98 | 70 | 58 |
| 10 | 200 | 0.6342 | 1.8378 | 228 | 163 | 134 |
| 20 | 228 | 0.5692 | 4.7303 | 462 | 311 | 248 |
| 30 | 250 | 0.6103 | 4.5286 | 515 | 360 | 293 |
| 40 | 250 | 0.6389 | 4.2269 | 534 | 384 | 317 |
| 50 | 250 | 0.6638 | 3.8889 | 539 | 396 | 331 |
| 60 | 250 | 0.6807 | 3.6332 | 536 | 400 | 337 |
| 70 | 250 | 0.6443 | 4.3298 | 558 | 403 | 334 |
| 80 | 250 | 0.6040 | 5.2872 | 587 | 409 | 331 |
| 90 | 250 | 0.6312 | 4.7101 | 578 | 413 | 339 |
| 100 | 250 | 0.5834 | 5.8579 | 603 | 412 | 330 |
| 110 | 250 | 0.6807 | 3.6738 | 542 | 404 | 341 |
| 120 | 250 | 0.6973 | 3.3450 | 524 | 397 | 338 |
| 130 | 250 | 0.7156 | 3.0482 | 511 | 394 | 339 |
| 140 | 250 | 0.7553 | 2.5233 | 490 | 391 | 344 |
| 150 | 250 | 0.7657 | 2.3948 | 483 | 390 | 344 |
| 160 | 250 | 0.7848 | 2.1592 | 467 | 384 | 342 |
| 170 | 250 | 0.7848 | 2.1491 | 465 | 382 | 341 |
| 180 | 250 | 0.7809 | 2.1796 | 465 | 380 | 339 |
| 190 | 250 | 0.7949 | 2.0206 | 454 | 376 | 337 |
| 200 | 250 | 0.8002 | 1.9473 | 446 | 371 | 334 |
| 210 | 250 | 0.7947 | 2.0110 | 451 | 374 | 335 |

Table VII illustrates that use of nitrate brines at lower temperatures allows the application of lower polymer loadings to achieve acceptable viscosity and thermal stability.

Example 10

A brine slurry was prepared containing 20 ppg of GW-3LE guar in 13.1 ppg sodium bromide/sodium nitrate brine and mixed for 30 minutes using an overhead stirrer. To the fluid was then added, 5.0 gallons per thousand gallons of BF-9L to adjust the pH of the fluid to a pH of 11.4 and 0.10 gallons per thousand gallons of BF-10L and 3.0 gallons per thousand gallons of XLW-56 and 1.0 gallons. 0.50 pounds per thousand gallons of GBW-24 was also added. Thereafter, fluid viscosity was determined as set forth in Example 3 above. The results are shown in Table VIII. The initial linear viscosity was 37 cP at 73° F. measured on a Chandler 3500 rheometer having a bob (B1) and rotor (R1) cup assembly at a rate of sweep of 511 $sec^{-1}$.

TABLE VIII

| Time Minutes | Temperature ° F. | n' | K' lb (f)/100 ft2 | 40 1/sec Viscosity (cP) | 100 1/sec Viscosity (cP) | 170 1/sec Viscosity (cP) |
|---|---|---|---|---|---|---|
| 0 | 83 | 0.6654 | 0.9290 | 129 | 95 | 80 |
| 10 | 180 | 0.2911 | 7.8349 | 274 | 143 | 98 |
| 20 | 203 | 0.4532 | 6.6854 | 426 | 258 | 193 |
| 30 | 225 | 0.6829 | 3.4537 | 513 | 384 | 324 |
| 40 | 225 | 0.7930 | 2.1812 | 487 | 403 | 361 |
| 50 | 225 | 0.8250 | 1.9220 | 482 | 411 | 375 |
| 60 | 225 | 0.8751 | 1.5342 | 463 | 413 | 387 |
| 70 | 225 | 0.8634 | 1.6199 | 469 | 413 | 385 |
| 80 | 225 | 0.7840 | 2.3935 | 517 | 424 | 378 |
| 90 | 225 | 0.7994 | 2.2932 | 524 | 436 | 392 |
| 100 | 225 | 0.6874 | 3.9736 | 600 | 451 | 382 |
| 110 | 225 | 0.7510 | 3.0444 | 582 | 463 | 406 |
| 120 | 225 | 0.6782 | 4.2705 | 624 | 464 | 392 |
| 130 | 225 | 0.6861 | 4.0953 | 616 | 462 | 391 |
| 140 | 225 | 0.6555 | 4.7847 | 643 | 469 | 390 |
| 150 | 225 | 0.6760 | 4.2990 | 623 | 463 | 390 |
| 160 | 225 | 0.7151 | 3.5481 | 594 | 457 | 393 |
| 170 | 225 | 0.7140 | 3.5033 | 584 | 449 | 386 |
| 180 | 225 | 0.7067 | 3.6456 | 592 | 452 | 387 |
| 190 | 225 | 0.7577 | 2.9078 | 569 | 456 | 401 |
| 200 | 225 | 0.6937 | 3.9093 | 605 | 457 | 388 |
| 210 | 225 | 0.6801 | 4.4804 | 659 | 492 | 415 |

Table VIII further illustrates that use of sodium bromide/sodium nitrate brines at lower temperatures allows the application of lower polymer loadings to achieve acceptable viscosity and thermal stability.

Comparative Example 11

A brine slurry was prepared containing 20 ppg of GW-3LE guar in 12.5 ppg sodium bromide and mixed for 30 minutes using an overhead stirrer. To the fluid was then added, 5.0 gallons per thousand gallons of BF-9L to adjust the pH of the fluid to a pH of 11.6 and 0.10 gallons per thousand gallons of BF-10L and 3.0 gallons per thousand gallons of XLW-56 and 1.0 gallons. 0.50 pounds per thousand gallons of GBW-24 was also added. Thereafter, fluid viscosity was determined as set forth in Example 3 above. The results are shown in Table IX. The initial linear viscosity was 27 cP at 72° F. measured on a Chandler 3500 rheometer having a bob (B1) and rotor (R1) cup assembly at a rate of sweep of 511 $sec^{-1}$.

TABLE IX

| Time Minutes | Temperature ° F. | n' | K' lb (f)/100 ft2 | 40 1/sec Viscosity (cP) | 100 1/sec Viscosity (cP) | 170 1/sec Viscosity (cP) |
|---|---|---|---|---|---|---|
| 0 | 92 | 0.1587 | 9.4717 | 204 | 94 | 60 |
| 10 | 185 | 0.0442 | 42.7043 | 602 | 251 | 151 |
| 20 | 206 | 0.7686 | 1.1901 | 243 | 196 | 174 |
| 30 | 225 | 2.2012 | 0.0007 | 30 | 89 | 169 |

The data of Tables VIII and IX is graphically represented in FIG. 1 and FIG. 2, respectively. The FIGs. show the difference between a sodium bromide brine versus an sodium nitrate/sodium bromide brine. The FIGs. show that the viscosity is maintained over a longer period of time at elevated temperature when a sodium nitrate/sodium bromide brine is used compared to sodium bromide brine.

In light of the enhanced viscosity and thermal stability over time, as demonstrated by the data above, such materials provide an excellent resource in the enhancement of lost circulation materials.

From the foregoing, it will be observed that numerous variations and modifications may be effected without departing from the true spirit and scope of the novel concepts of the invention.

What is claimed is:

1. A method of treating a hydrocarbon-bearing subterranean formation which comprises pumping into a well penetrating the formation a well treatment fluid having a pH greater than or equal to 9.0, the well treatment fluid comprising an alkali nitrate brine having a density greater than or equal to 12.5 ppg at 70° F., a crosslinkable polymer selected from the group consisting of guar gum, hydroxyalkyl guar and carboxyalkylhydroxyalkyl guar and a crosslinking agent; wherein the viscosity of and thermal stability exhibited by the well treatment fluid at the downhole temperature is greater than the viscosity of and thermal stability exhibited by a substantially similar brine-based well treatment fluid which does not contain an alkali nitrate salt.

2. The method of claim 1, wherein the alkali nitrate brine further comprises an alkali halide.

3. The method of claim 2, wherein the alkali halide is sodium bromide.

4. The method of claim 2, wherein the alkali nitrate brine is composed a 95:5 to 5:95 weight ratio of alkali nitrate:alkali halide.

5. The method of claim 1, wherein the downhole temperature is in excess of 150° F.

6. The method of claim 5, wherein the downhole temperature is in excess of 300° F.

7. The method of claim 6, wherein the downhole temperature is in excess of 350° F.

8. The method of claim 1, wherein the density of the alkali nitrate brine is between from about 12.5 to about 13.1 at 70° F.

9. The method of claim 1, wherein the density of the well treatment fluid is greater than or equal to 12.8 ppg at 70° F.

10. The method of claim 8, wherein the density of the well treatment fluid is 13.1 ppg at 70° F.

11. The method of claim 1, wherein the brine-based well treating composition is pumped into a propagated fracture or into the subterranean formation at a pressure sufficient to fracture the formation.

12. The method of claim 11, wherein the brine-based well treatment fluid further comprises a proppant.

13. The method of claim 1, wherein the brine-based well treatment fluid further comprises a delayed internal breaker.

14. The method of claim 1, wherein the well treatment composition further comprises a crosslinking delaying agent.

15. The method of claim 1, wherein the alkali nitrate brine is a sodium nitrate brine.

16. A method for reducing the loss of fluids into flow passages of a subterranean formation during well drilling, completion, or workover operations which comprises introducing into the flow passages an effective amount of a well treatment composition having a pH greater than or equal to 9.0, the well treatment composition comprising a brine containing an alkali nitrate having a density greater than or equal to 12.5 ppg at 70° F., a crosslinkable polymer selected from the group consisting of guar gum, hydroxyalkyl guar and carboxyalkylhydroxylalkyl guar and a crosslinking agent and then viscosifying the well treatment composition, thereby reducing the loss of fluids into the flow passages upon resuming of the well drilling, completion or workover operation.

17. The method of claim 16, wherein the well treatment composition reduces the loss of drilling fluids, completion fluids or workover fluids into the flow passages of the formation.

18. The method of claim 16, wherein the alkali nitrate is sodium nitrate.

19. The method of claim 16, wherein the density of the well treatment composition is greater than or equal to 12.8 ppg at 70° F.

20. A method of treating a well in communication with a subterranean formation penetrated by a wellbore which comprises:
  (a) introducing a pumpable well treatment composition having a pH greater than or equal to 9.0, the well treatment composition comprising a sodium nitrate brine having a density greater than or equal to 12.5 ppg at 70° F.; a crosslinkable polymer selected from the group consisting of guar, hydroxypropyl guar and carboxyalkylhydroxyalkyl guar; and a crosslinking agent into the well;
  (b) increasing the viscosity of the well treatment composition; and
  (c) forming a fluid-impermeable barrier within the formation or within the wellbore from the composition resulting from step (b) and thereby reducing the permeability of the formation, mitigating loss of fluid into the formation and/or reducing fluid communication within the wellbore.

* * * * *